(12) United States Patent
Itaya

(10) Patent No.: US 11,171,366 B2
(45) Date of Patent: Nov. 9, 2021

(54) METHOD FOR CONTROLLING NON-AQUEOUS ELECTROLYTE SECONDARY BATTERY

(71) Applicant: Murata Manufacturing Co., Ltd., Nagaokakyo (JP)

(72) Inventor: Masaharu Itaya, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 1264 days.

(21) Appl. No.: 15/443,474

(22) Filed: Feb. 27, 2017

(65) Prior Publication Data

US 2017/0170528 A1 Jun. 15, 2017

Related U.S. Application Data

(63) Continuation of application No. PCT/JP2015/069175, filed on Jul. 2, 2015.

(30) Foreign Application Priority Data

Aug. 29, 2014 (JP) .............................. JP2014-175393

(51) Int. Cl.
*H01M 10/44* (2006.01)
*H01M 4/485* (2010.01)
*H01M 10/42* (2006.01)
*H01M 10/0525* (2010.01)

(52) U.S. Cl.
CPC ........... *H01M 10/44* (2013.01); *H01M 4/485* (2013.01); *H01M 10/0525* (2013.01); *H01M 10/4207* (2013.01); *H01M 10/441* (2013.01)

(58) Field of Classification Search
CPC ......... H01M 10/0525; H01M 10/4207; H01M 10/44; H01M 10/441; H01M 4/485
See application file for complete search history.

(56) References Cited

U.S. PATENT DOCUMENTS

| 6,274,271 | B1 | 8/2001 | Koshiba et al. | |
| 7,722,989 | B2 | 5/2010 | Ohzuku et al. | |
| 7,939,200 | B2 | 5/2011 | Ohzuku et al. | |
| 2005/0069758 | A1 | 3/2005 | Kitao et al. | |
| 2005/0147889 | A1* | 7/2005 | Ohzuku ................ | H01M 4/131 429/231.1 |
| 2006/0204847 | A1 | 9/2006 | Ohzuku et al. | |
| 2007/0178376 | A1* | 8/2007 | Fujikawa ............ | H01M 2/1686 429/144 |

(Continued)

FOREIGN PATENT DOCUMENTS

JP H10-69922 A 3/1998
JP 2005-129492 A 5/2005

(Continued)

OTHER PUBLICATIONS

International Search Report issued in International Application No. PCT/JP2015/069175, dated Oct. 6, 2015.

(Continued)

*Primary Examiner* — Adam A Arciero
(74) *Attorney, Agent, or Firm* — Arent Fox LLP

(57) ABSTRACT

A method for controlling a non-aqueous electrolyte secondary battery that includes connecting two non-aqueous electrolyte secondary batteries in series and setting the discharge cutoff voltage to 3.4 V to 4.6 V.

4 Claims, 7 Drawing Sheets

(56) References Cited

U.S. PATENT DOCUMENTS

2010/0304206 A1* 12/2010 Nakashima ........... H01M 10/30
429/156

FOREIGN PATENT DOCUMENTS

| JP | 2005-142047 A | 6/2005 |
|----|---------------|--------|
| JP | 2013-041781 A | 2/2013 |

OTHER PUBLICATIONS

Written Opinion of the International Searching Authority issued in International Application No. PCT/JP2015/069175, dated Oct. 6, 2015.

* cited by examiner

METHOD FOR CONTROLLING NON-AQUEOUS ELECTROLYTE SECONDARY BATTERY

CROSS REFERENCE TO RELATED APPLICATIONS

The present application is a continuation of International application No. PCT/JP2015/069175, filed Jul. 2, 2015, which claims priority to Japanese Patent Application No. 2014-175393, filed Aug. 29, 2014, the entire contents of each of which are incorporated herein by reference.

FIELD OF THE INVENTION

The present invention relates to a non-aqueous electrolyte secondary battery such as a lithium ion secondary battery, and more particularly, to a method for controlling a non-aqueous electrolyte secondary battery, for suppressing cycle characteristic degradation in the case of using two non-aqueous electrolyte secondary batteries connected in series.

BACKGROUND OF THE INVENTION

In recent years, the reduction in size and weight for cellular phones, laptop computers, and the like has progressed rapidly, and batteries as power sources for driving the phones, the computers, and the like have been required to have higher capacities. Further, under such circumstances, non-aqueous electrolyte secondary batteries typified by lithium ion secondary batteries have been widely used as power sources.

Now, high-energy density non-aqueous electrolyte secondary batteries typified by lithium ion secondary batteries and the like as described above are generally manufactured by such a method as described below.

First, rolled sheet-like current collector foil (e.g., aluminum foil, copper foil) is run through a die coater, a comma coater, or the like to apply an active material (e.g., a lithium composite oxide, carbon) onto the current collector foil, thereby preparing sheet-like electrodes.

Then, the sheet-like electrodes are stacked or wound with separators interposed therebetween for preventing short circuits due to contact between the electrodes, thereby preparing electrode groups.

Thereafter, aluminum tabs or nickel tabs to serve as external terminal electrodes are welded to the electrodes by ultrasonic welding, so as to make electrical connections to the electrodes.

Then, elements including the thus prepared electrode groups are put in exterior packages such as aluminum cans or aluminum laminate films, and the packages are sealed after injecting an electrolytic solution.

Thus, non-aqueous electrolyte secondary batteries are prepared.

Incidentally, in recent years, as typified by batteries of hybrid vehicles, non-aqueous electrolyte secondary batteries (electric storage devices) have strongly required to achieve higher reliability for cycle characteristics and the like, and charge/discharge rate characteristics improved by lowered resistance.

As such non-aqueous electrolyte secondary batteries, non-aqueous electrolyte secondary batteries have been studied which use lithium-titanium oxides for negative electrode active materials. Lithium-titanium oxides for negative electrode active materials are less likely to undergo a change in crystal lattice volume with charge and discharge, and thus less likely to be degraded by expansion and contraction of the crystal structure, and the reaction between the negative electrode and an electrolytic solution is inhibited because the high potential for storage and release of lithium ions is +1.55 V on the basis of $Li/Li^+$. The oxides are known to have high reliability for cycle characteristics and the like, as compared with when carbon such as graphite is used for negative electrode active materials.

Further, as a technique for improving resistance to overdischarge and resistance to overcharge at high temperatures of 60 to 80° C., Patent Document 1 proposes a non-aqueous electrolyte lithium secondary battery which has reliability improved by making a negative electrode capacity (mAh) lower than a positive electrode capacity (mAh).

However, in the case of using non-aqueous electrolyte secondary batteries proposed conventionally, there is the problem of failing to develop cycle characteristics of single cells even in the case of a discharge cutoff voltage of, for example, 2.0 V (that is, in the case of a discharge cutoff voltage of 1.0 V per single cell) when two non-aqueous electrolyte secondary batteries are connected in series and used, even though favorable cycle characteristics are achieved in the case of a discharge cutoff voltage (for example, the discharge cutoff voltage of 1.0 V in Patent Document 1) per non-aqueous electrolyte secondary battery (single cell).

More specifically, even when charge-discharge cycles are performed under the same condition, in the case of using two non-aqueous electrolyte secondary batteries connected in series, there is the problem of losing the voltage balance during discharge, thereby resulting in cycle characteristics degraded dramatically as compared with cycle characteristics of single cells.

In addition, in order to respond to such a lost voltage balance, it is also common to provide balance circuits, which have the problem of causing an increase in cost and are complex in structure.

Patent Document 1: Japanese Patent Application Laid-Open No. 10-69922

SUMMARY OF THE INVENTION

The present invention is intended to solve the problems mentioned above, an object of the invention is to provide a method for controlling a non-aqueous electrolyte secondary battery, which is capable of suppressing cycle characteristic degradation in the case of using two non-aqueous electrolyte secondary batteries connected in series.

In order to solve the problems, the present invention provides a method for controlling a non-aqueous electrolyte secondary battery. The non-aqueous electrolyte secondary battery includes an exterior material; a positive electrode housed in the exterior material, the positive electrode including a lithium-transition metal oxide that has a layered crystal structure; a negative electrode housed in the exterior material, the negative electrode including a spinel-type lithium-titanium composite oxide; and a non-aqueous electrolyte packed in the exterior material. The positive electrode and the negative electrode meet a condition of the following formula (1):

$$1.0 > X \quad (1)$$

X represents an actual electric capacity ratio denoted by (B/A), A represents an actual electric capacity (mAh) at 25° C. per area 1 $cm^2$ of the positive electrode, and B represents an actual electric capacity (mAh) at 25° C. per area 1 $cm^2$ of the negative electrode. A discharge cutoff voltage is set to 3.4 V to 4.6 V when two non-aqueous electrolyte secondary batteries are connected in series.

In accordance with the method for controlling a non-aqueous electrolyte secondary battery according to the present invention, the discharge cutoff voltage is set to be 3.4 V to 4.6 V when using two non-aqueous electrolyte secondary batteries connected in series, and cycle characteristics of the two-series cell can be thus improved significantly.

In addition, the need for balance circuits is eliminated, thereby making it possible to reduce the number of components significantly.

More specifically, in the case of using two non-aqueous electrolyte secondary batteries connected in series, each basically composed of: a negative electrode containing, as its main constituent, a spinel-type lithium-titanium composite oxide; a positive electrode that has a higher potential than the spinel-type lithium-titanium composite oxide; and an organic electrolytic solution, where the actual electric capacity per unit area of the negative electrode is made lower than the actual electric capacity per unit are of the positive electrode, the discharge cutoff voltage is set to be 3.4 V or higher, thereby making it possible for the relation between the discharge potentials of one non-aqueous electrolyte secondary battery and the other non-aqueous electrolyte secondary battery to fall within the range of 2.3 V:1.1 V to 1.7 V:1.7 V, and making it possible to suppress, even when one non-aqueous electrolyte secondary battery and the other of the two non-aqueous electrolyte secondary batteries connected in series lose the capacity balance therebetween, the phenomenon of causing overdischarge degradation and causing the overdischarge degradation to cause further overdischarge degradation.

Details will be described in the following embodiment.

DETAILED DESCRIPTION OF THE INVENTION

Prior to providing a specific embodiment of the invention, a summary of a configuration according to the present invention will be presented first.

The non-aqueous electrolyte secondary battery to which a control method according to the present invention is applied, includes a positive electrode, a negative electrode and an electrolytic solution. The positive electrode can include aluminum foil as a positive electrode current collector, and a combination material layer including a lithium-transition metal oxide that has a layered crystal structure as a positive electrode active material layer on the aluminum foil. The lithium-transition metal oxide that has a layered crystal structure can be, for example, a lithium composite oxide such as $LiCoO_2$ or $LiCo_{1/3}Ni_{1/3}Mn_{1/3}O_2$.

The negative electrode can include aluminum foil as a negative electrode current collector layer, and a combination material layer including a lithium-titanium oxide that has a spinel-type crystal structure as a negative electrode active material layer on the aluminum foil. Furthermore, a separator layer is interposed between the opposed positive electrode and negative electrode, thereby preventing short circuits due to contact between the electrodes.

The electrolytic solution can be, for example, an electrolytic solution where one or more electrolytes selected from $LiPF_6$, $LiBF_4$, and LiTFSI are dissolved in one solvent selected from dimethyl carbonate, diethyl carbonate, methyl ethyl carbonate, propylene carbonate, and acetonitrile, or a mixed organic solvent of multiple solvents selected therefrom.

Among these electrolytic solutions, typical electrolytic solutions include 1 mol/L of $LiPF_6$ dissolved in a mixed solvent of propylene carbonate.

In addition, electrolytic solutions and the like can be also used where the organic solvents and electrolyte salts mentioned above are dissolved in one or more ionic liquids selected from 1-ethyl-3-methylimidazolium tetrafluoroborate and 1-ethyl-3methylimidazoliumbis(trifluoromethanesulfonyl)imide as solvents.

The charge cutoff voltage is 5.50 V, preferably 5.20 V, and more preferably 5.00 V, whereas the discharge cutoff voltage is desirably 3.40 V.

Figure 11:
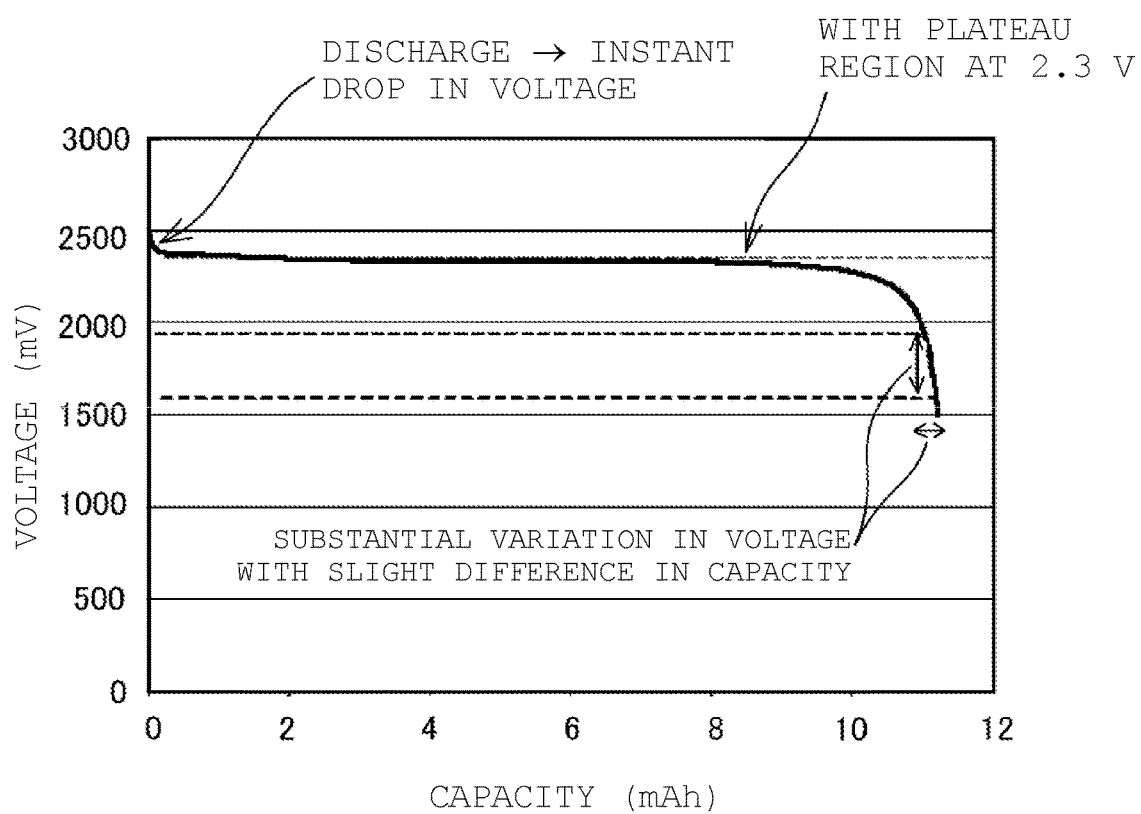
FIG. 11 is a diagram showing a model for a discharge behavior of a single cell for a non-aqueous electrolyte secondary battery to which the control method according to the present invention is applied.

It is to be noted that according to the present invention, the discharge cutoff voltage has an upper limit of 4.6 V, due to the fact that the discharge voltage required to produce a substantial capacity is 4.6 V (2.3 V per single cell (see FIG. 11)) in the two-series non-aqueous electrolyte secondary battery as shown in FIG. 11.

Features of the present invention will be described in detail below with reference to an embodiment of the present invention.

Embodiment (1) Preparation of Positive Electrode

A lithium-cobalt composite oxide (LCO) represented by the composition formula $LiCoO_2$ as a positive electrode active material, carbon as a conductive agent, and polyvinylidene fluoride (PVDF) as a binder were combined to meet 90:7:3 in ratio by weight, and kneaded with N-methyl-2-pyrrolidone (NMP), thereby preparing slurry. This slurry was applied to aluminum foil as a current collector, so as to reach predetermined weight, dried, and then subjected to rolling by roll press, and to punching into 3 $cm^2$, thereby preparing a positive electrode.

The thickness of the positive electrode was adjusted by roll press such that the positive electrode was 3.3 $g/cm^3$ in filling density.

The weight of the positive electrode (layer) was 8.8 $mg/cm^2$ on one side.

(2) Preparation of Negative Electrode

A spinel-type lithium-titanium composite oxide represented by $Li_4Ti_5O_{12}$ as a negative electrode active material and PVDF as a binder were combined to meet 95:5 in ratio by weight, and kneaded with NMP, thereby preparing slurry.

This slurry was applied to aluminum foil as a current collector, so as to reach predetermined weight, dried, and then subjected to rolling by roll press, and to punching into 3 $cm^2$, thereby preparing a negative electrode.

The thickness of the negative electrode layer was adjusted by roll press such that the negative electrode layer was all 2.0 $g/cm^3$ in filling density.

The weight of the negative electrode layer was 10.6 $mg/cm^2$ on one side.

(3) Preparation of Non-Aqueous Electrolytic Solution

A non-aqueous electrolytic solution was prepared by dissolving 1 mol/l of $LiPF_6$ in a mixed solvent of propylene carbonate.

(4) Preparation of Battery

Figure 1:
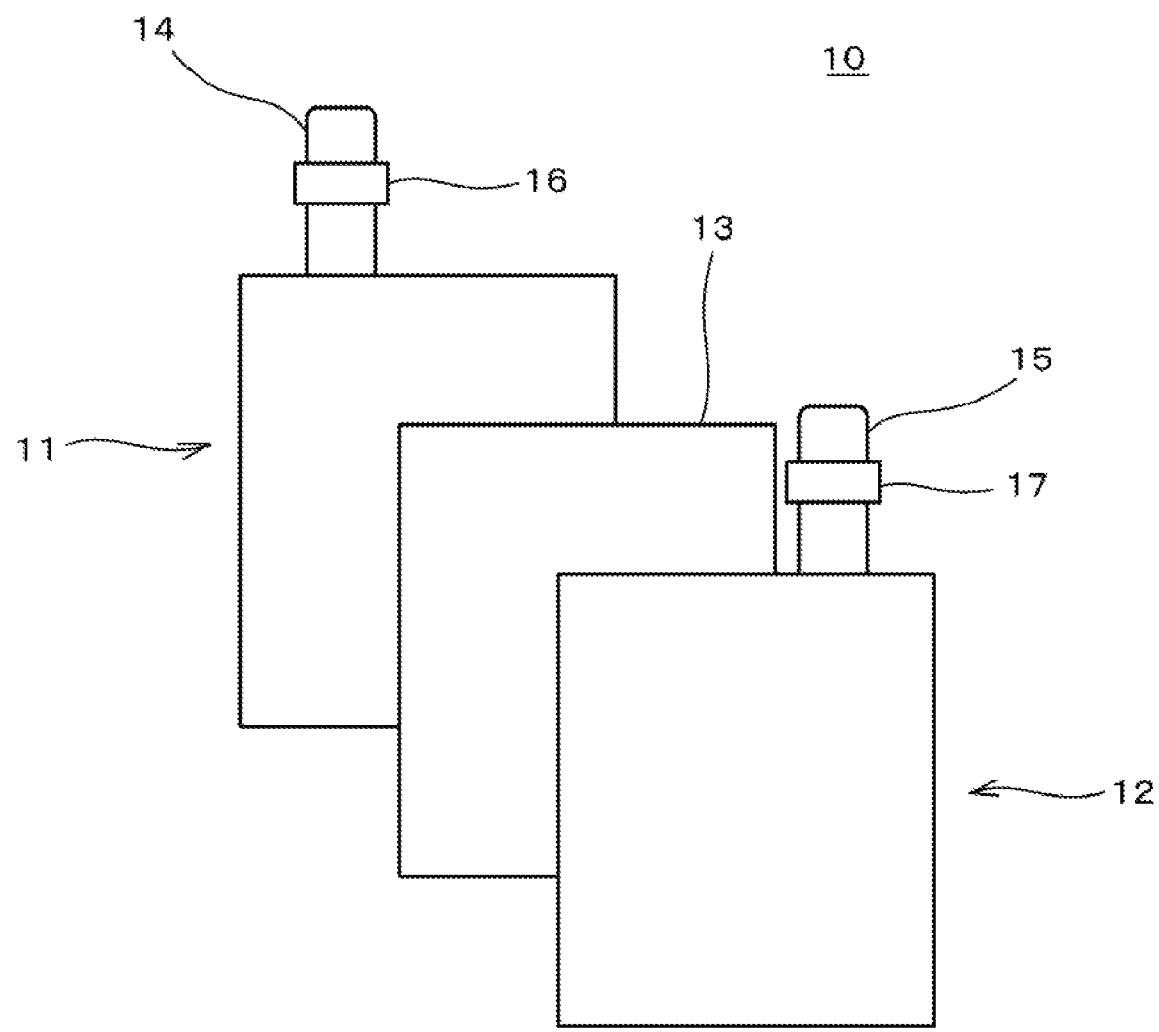
FIG. 1 is an exploded perspective view illustrating a battery element of a non-aqueous electrolyte secondary battery to which a control method according to an embodiment of the present invention is applied, that is, a battery element including a positive electrode, a negative electrode, and a separator.

As shown in FIG. 1, a positive electrode 11 and a negative electrode 12 prepared by the methods mentioned above were provided with lead tabs 14, 15. A porous separator 13 (air permeability: 10 sec. 100 cc) composed of a polyamideimide was interposed and laminated between the positive electrode 11 and the negative electrode 12, thereby preparing a battery element 10.

Figure 2:
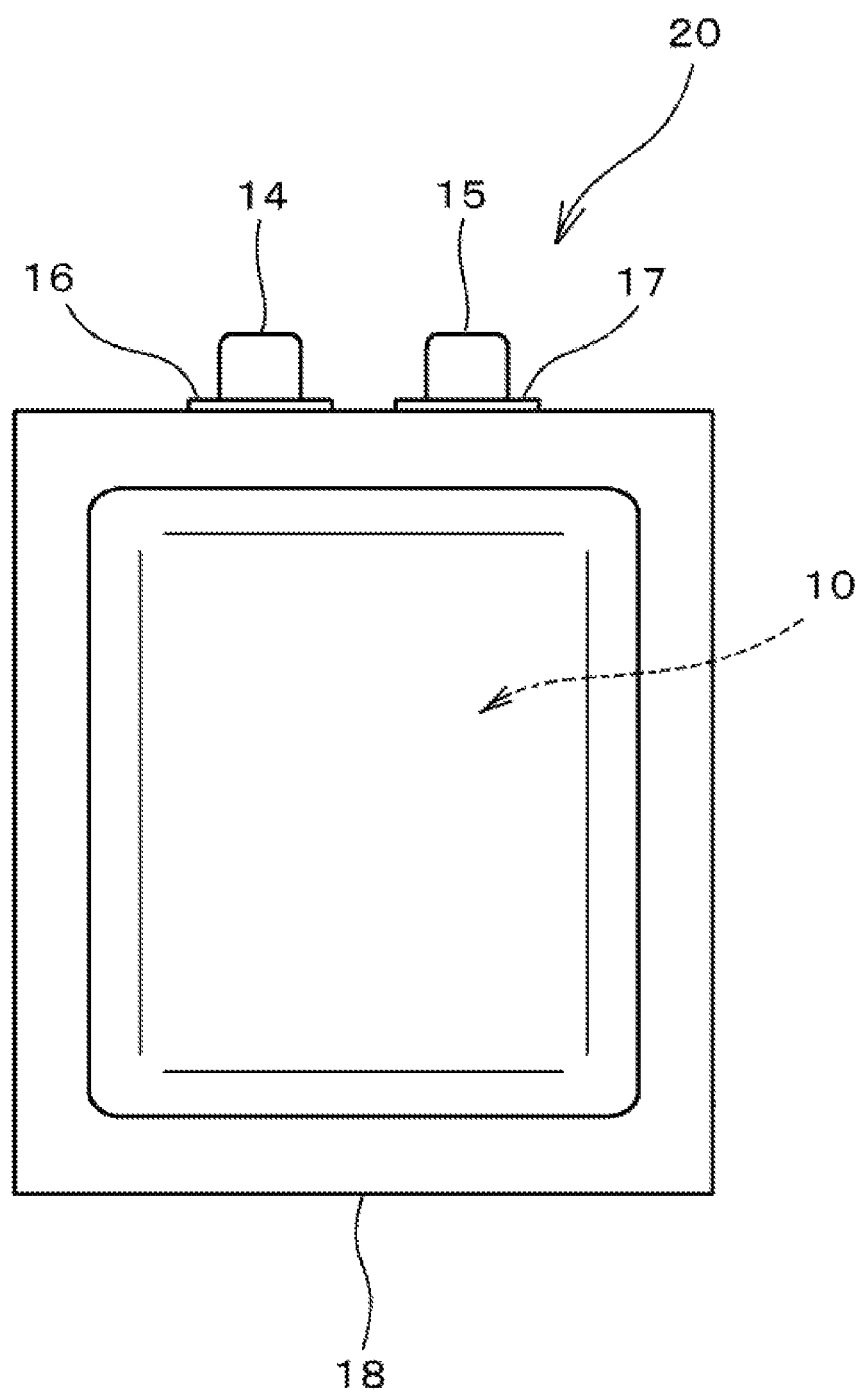
FIG. 2 is a perspective view illustrating the appearance configuration of a non-aqueous electrolyte secondary battery to which a control method according to an embodiment of the present invention is applied.
Figure 3:
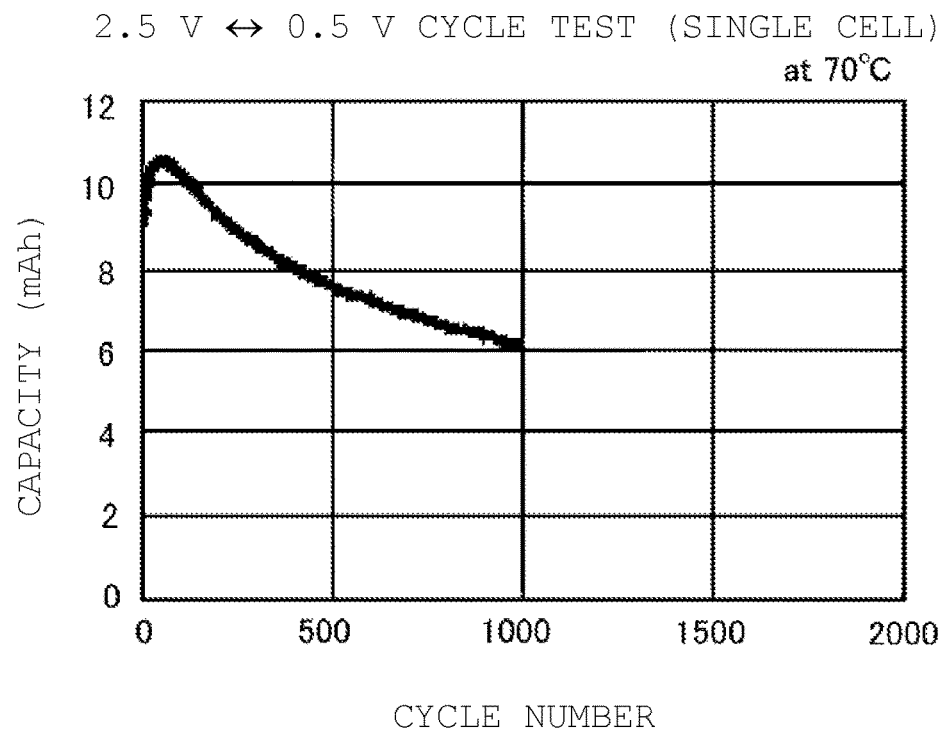
FIG. 3 is a diagram showing the result of a cycle test 1 carried out with a single cell for a non-aqueous electrolyte secondary battery.
Figure 4:
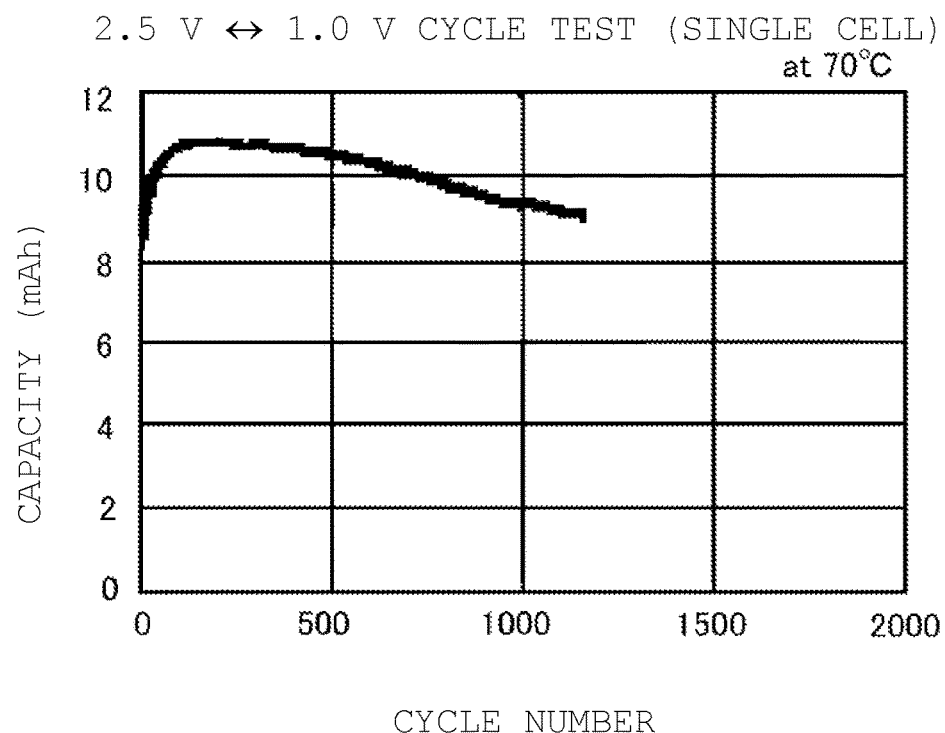
FIG. 4 is a diagram showing the result of a cycle test 2 carried out with a single cell for a non-aqueous electrolyte secondary battery.
Figure 5:
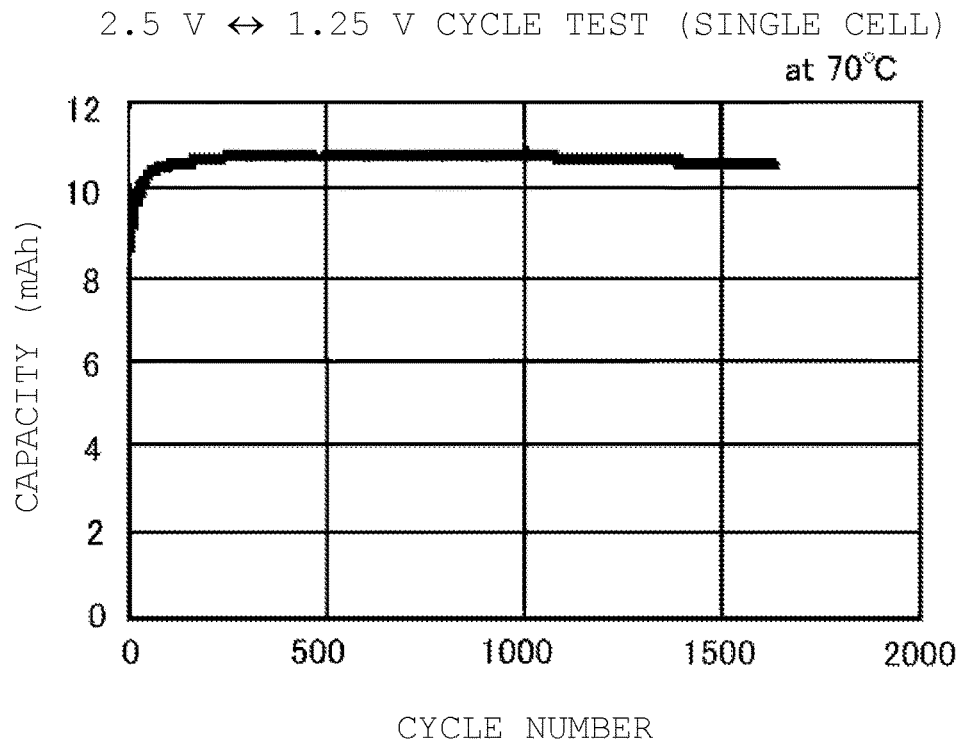
FIG. 5 is a diagram showing the result of a cycle test 3 carried out with a single cell for a non-aqueous electrolyte secondary battery.
Figure 6:
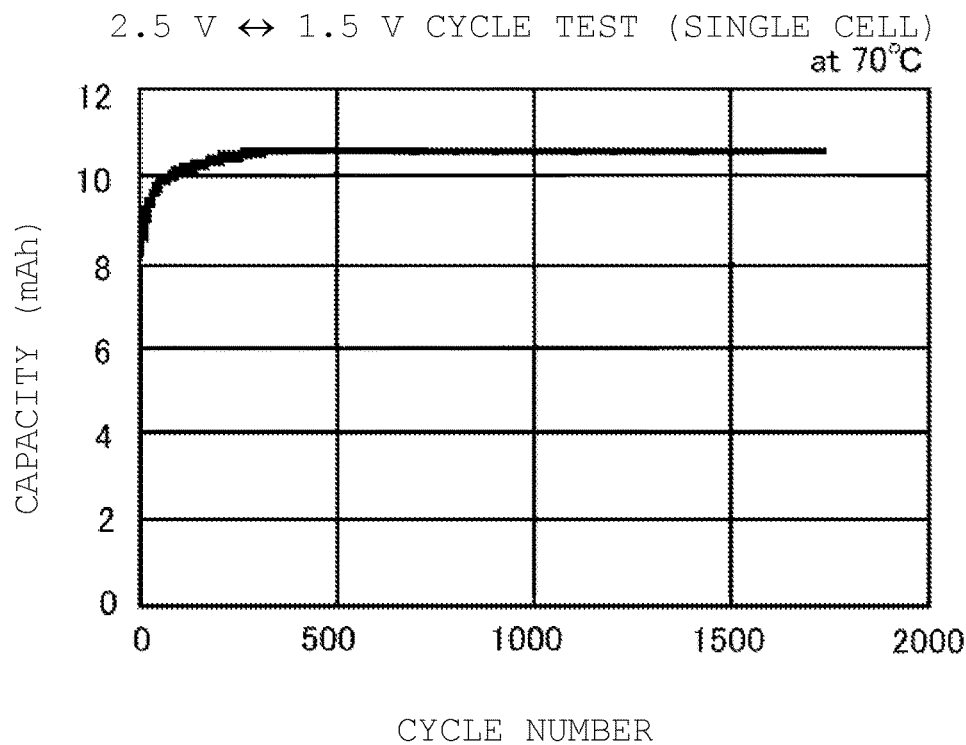
FIG. 6 is a diagram showing the result of a cycle test 4 carried out with a single cell for a non-aqueous electrolyte secondary battery.
Figure 7:
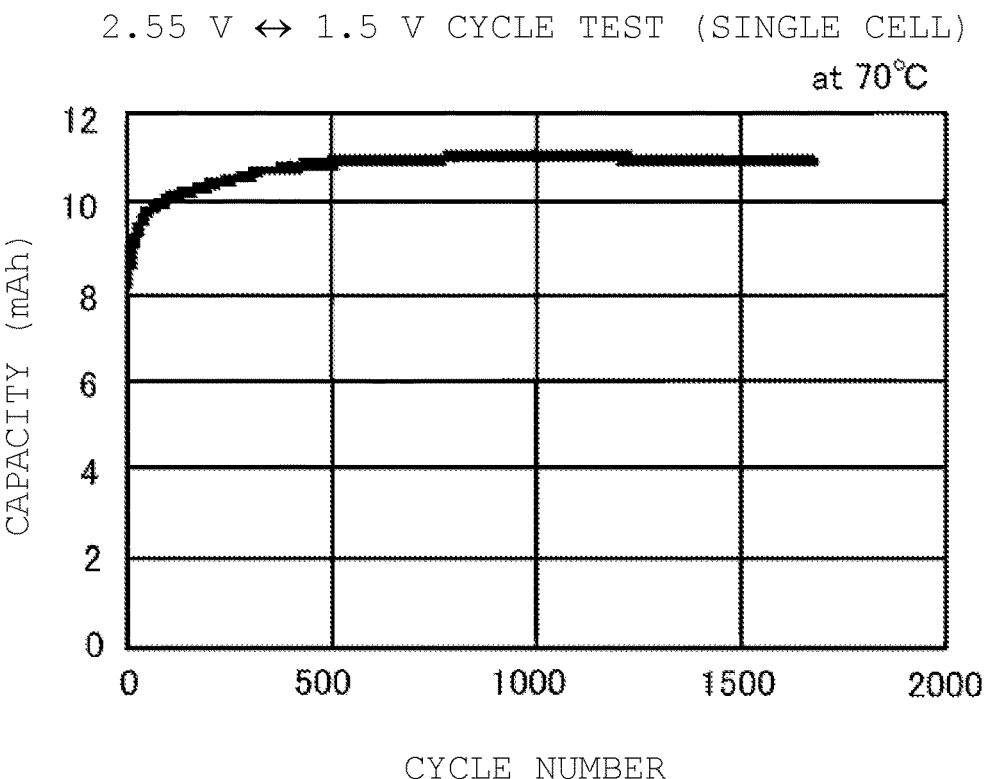
FIG. 7 is a diagram showing the result of a cycle test 5 carried out with a single cell for a non-aqueous electrolyte secondary battery.
Figure 8:
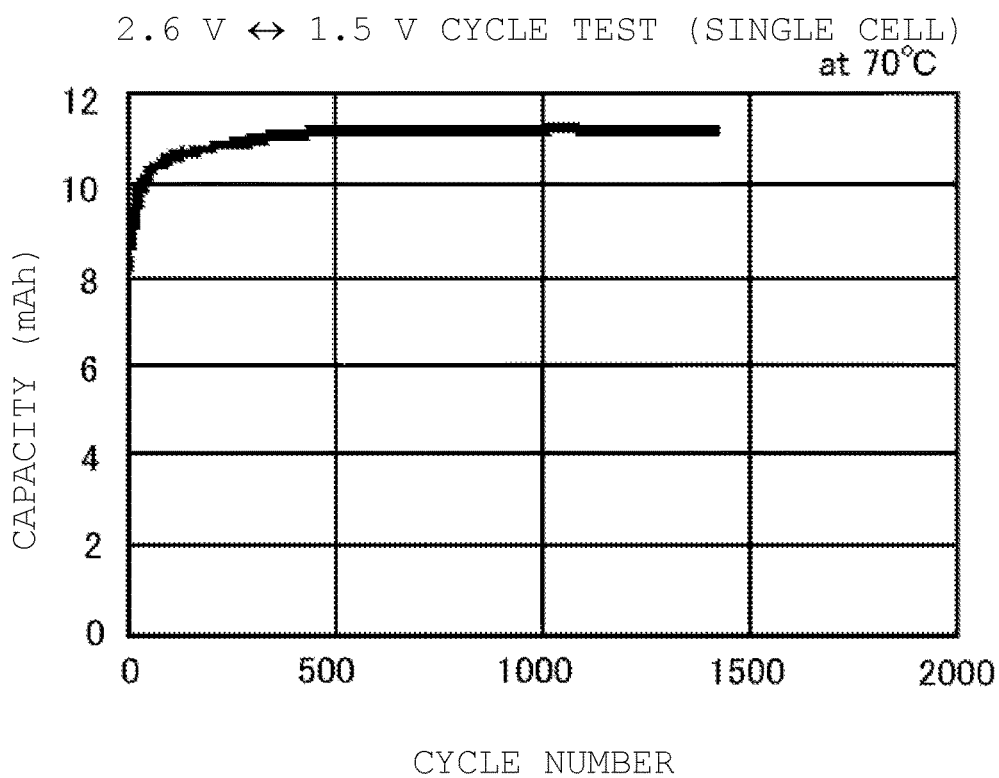
FIG. 8 is a diagram showing the result of a cycle test 6 carried out with a single cell for a non-aqueous electrolyte secondary battery.

Then, after attaching sealants 16 and 17 respectively to the lead tabs 14 and 15, the battery element (laminated body) 10 was housed in an outer package material 18 composed of a laminate film including an aluminum layer as an intermediate layer between resin layers, as shown in FIG. 2. Thereafter, a non-aqueous electrolytic solution prepared by the method mentioned above was injected into the outer package material 18, and an opening of the outer package material 18 was then sealed, thereby preparing a non-aqueous electrolyte secondary battery 20. It is to be noted that the outer package material 18 is not to be considered limited to any sac-shaped material that uses a laminate film as described above, but it is possible to use various forms that can seal the battery element along with the non-aqueous electrolytic solution, and it is also possible to use, for example, a can-shaped material.

It is to be noted that this non-aqueous electrolyte secondary battery 20 is configured such that the actual electric capacity per unit area of the negative electrode 12 is lower than the actual electric capacity per unit area of the positive electrode 11, and the battery is configured such that the positive electrode and the negative electrode meet the requirement expressed by the following formula (1):

$$1.0 > X \qquad (1)$$

(X represents an actual electric capacity ratio denoted by (B/A), A represents an actual electric capacity (mAh) at 25° C. per area 1 $cm^2$ of the positive electrode, and B represents an actual electric capacity (mAh) at 25° C. per area 1 $cm^2$ of the negative electrode)

(5) High-Temperature Rapid Charge-Discharge Cycle Test (5-1) A two-series non-aqueous electrolyte secondary battery containing two series-connected non-aqueous electrolyte secondary batteries prepared in the way described above was subjected to a high-temperature rapid charge-discharge cycle test. For the high-temperature rapid charge-discharge cycle test, first, under an atmosphere at a temperature of 70° C., the battery was subjected to constant-current charge at a current of 50 mA until the voltage reached 5.0 V, and after reaching 5.0 V, subjected to constant-voltage charge until the current reached 0.2 mA.

Thereafter, with a current of 50 mA, the battery was subjected to constant-current discharge:

(a) until the voltage (discharge cutoff voltage) reached 3.0 V as a condition 1;

(b) until the voltage (discharge cutoff voltage) reached 3.2 V as a condition 2;

(c) until the voltage (discharge cutoff voltage) reached 3.4 V as a condition 3;

(d) until the voltage (discharge cutoff voltage) reached 3.6 V as a condition 4; or (e) until the voltage (discharge cutoff voltage) reached 3.8 V as a condition 5, as one cycle.

It is to be noted that for the sake of safety, the cycle measurement was stopped when the capacity retention rate fell down below 50% (in the case of the condition 1 with the discharge cutoff voltage of 3.0 V).

Then, this cycle was performed 2000 cycles, thereby checking the capacity retention rate after the 2000 cycles in the high-temperature rapid charge-discharge cycle test.

It is to be noted that the capacity retention rate (%) was obtained from the following formula (2).

$$(\text{Discharge Capacity in 2000-th Cycle/Discharge Capacity in First Cycle}) \times 100 \qquad (2)$$

Table 1 shows the capacity retention rates after the 2000 cycles in the case of the test carried out under the conditions 1 to 5 described above, for the two-series non-aqueous electrolyte secondary battery.

TABLE 1

|  | Discharge cutoff voltage (V) | Capacity retention rate after 2000 cycles |
| --- | --- | --- |
| Condition 1 | 3.0 | — |
| Condition 2 | 3.2 | 52% |
| Condition 3 | 3.4 | 100% |
| Condition 4 | 3.6 | 100% |
| Condition 5 | 3.8 | 100% |

Among the respective conditions described above, under the conditions 3 to 5 with the discharge cutoff voltages of 3.4 V, 3.6 V, and 3.8 V, the capacity retention rates were kept at 100%.

On the other hand, in the case of the condition 2 with the discharge cutoff voltage of 3.2 V, the capacity retention rate was decreased down to 52%. In addition, in the case of the condition 1 with the discharge cutoff voltage of 3.2 V, the capacity retention rate fell down below 50%.

From the foregoing results, it is determined that in the case of the two-series non-aqueous electrolyte secondary battery described above, the cutoff voltage of 3.4 V or higher can achieve the capacity retention rate of 100% in the cycle test of the 2000 cycles at 70° C.

(5-2) In addition, for the non-aqueous electrolyte secondary battery in the way described above, the single cell was subjected to:

1) a cycle test 1 of repeatedly charging the cell until the voltage reached 2.5 V and discharging the cell until the voltage reached 0.5 V;

2) a cycle test 2 of repeatedly charging the cell until the voltage reached 2.5 V and discharging the cell until the voltage reached 1.0 V;

3) a cycle test 3 of repeatedly charging the cell until the voltage reached 2.5 V and discharging the cell until the voltage reached 1.25 V;

4) a cycle test 4 of repeatedly charging the cell until the voltage reached 2.5 V and discharging the cell until the voltage reached 1.5 V;

5) a cycle test 5 of repeatedly charging the cell until the voltage reached 2.55 V and discharging the cell until the voltage reached 1.5 V; and 6) a cycle test 6 of repeatedly charging the cell until the voltage reached 2.6 V and discharging the cell until the voltage reached 1.5 V;

FIGS. 3 to 8 show the results, or the results of the cycle tests 1 to 6.

From FIGS. 3 to 8, it is determined that the non-aqueous electrolyte secondary battery configured as described above has, in the case of the single cell, favorable cycle characteristics when the discharge cutoff voltage exceeds 1.0 V, and cycle characteristic degradation is significantly affected by the low discharge voltage, rather than the value of the charge voltage which is generally likely to affect cycle characteristics.

It is believed that the low discharge voltage significantly affects cycle characteristic degradation, because an unstable $Li_4$-$xTi_5O_{12}$ structure has high activity in a mixed state of trivalent titanium and tetravalent titanium, in particular, in a state with more tetravalent titanium at the end of the discharge, and thus react with the electrolytic solution, thereby leading to electrode destruction associated with gas generation.

In particular, when the positive electrode and the negative electrode meet the relation of positive electrode>negative electrode in terms of magnitude of actual electric capacity (mAh), the voltage of the positive electrode drops at the end of the discharge, but when the actual electric capacity (mAh) of the negative electrode is made lower than the actual electric capacity (mAh) of the positive electrode, the negative electrode is turned to a more unstable $Li_4$-$xTi_5O_{12}$ structure with high activity at the end of the discharge, thereby leading to cycle characteristic degradation.

On the other hand, for the two-series non-aqueous electrolyte secondary battery (sample), a cycle test was carried out under the following condition.

Charge: 50 mA/5 V to 0.5 mA
Pause: 30 sec
Discharge: 50 mA to 3 V
Pause: 30 sec
Temperature: 25° C.

As a result, it has been confirmed that some of multiple samples (two-series non-aqueous electrolyte secondary batteries) have favorable cycle characteristics, whereas the others have cycle characteristics significantly degraded.

Figure 9:
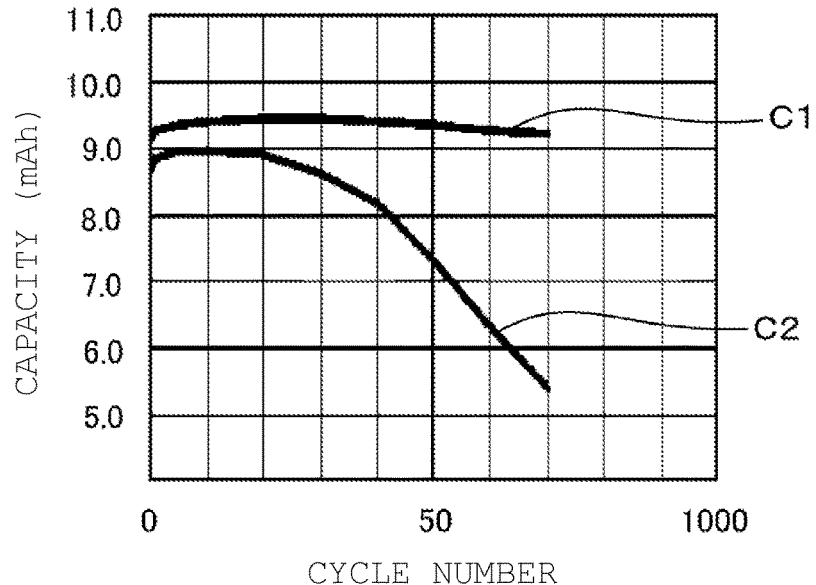
FIG. 9 is a diagram showing the course of a 5.0 V⇔3.0 V cycle test at 25° C. for a two-series non-aqueous electrolyte secondary battery C1 that has favorable cycle characteristics and a two-series non-aqueous electrolyte secondary battery C2 that has cycle characteristics significantly degraded.

FIG. 9 is a diagram showing the course of a 5.0 V⇔3.0 V cycle test at 25° C. for a two-series non-aqueous electrolyte secondary battery C1 that has favorable cycle characteristics and a two-series non-aqueous electrolyte secondary battery C2 that has cycle characteristics significantly degraded.

Further, the two-series non-aqueous electrolyte secondary battery C2 after the implementation of 772 cycles, with cycle characteristics significantly degraded, as shown in FIG. 9, was checked for:

(a) the voltage behavior in the case of discharging the whole two-series non-aqueous electrolyte secondary battery C2 (two-series cell); and (b) the voltage behaviors (voltage balance) in the case of discharging each of non-aqueous electrolyte secondary batteries C2a and C2b constituting the two-series non-aqueous electrolyte secondary battery C2.

It is to be noted that the test condition is the same as the condition in the case of the cycle test for the two-series non-aqueous electrolyte secondary battery (sample) as mentioned above. The results are shown in FIG. 10.

Figure 10:
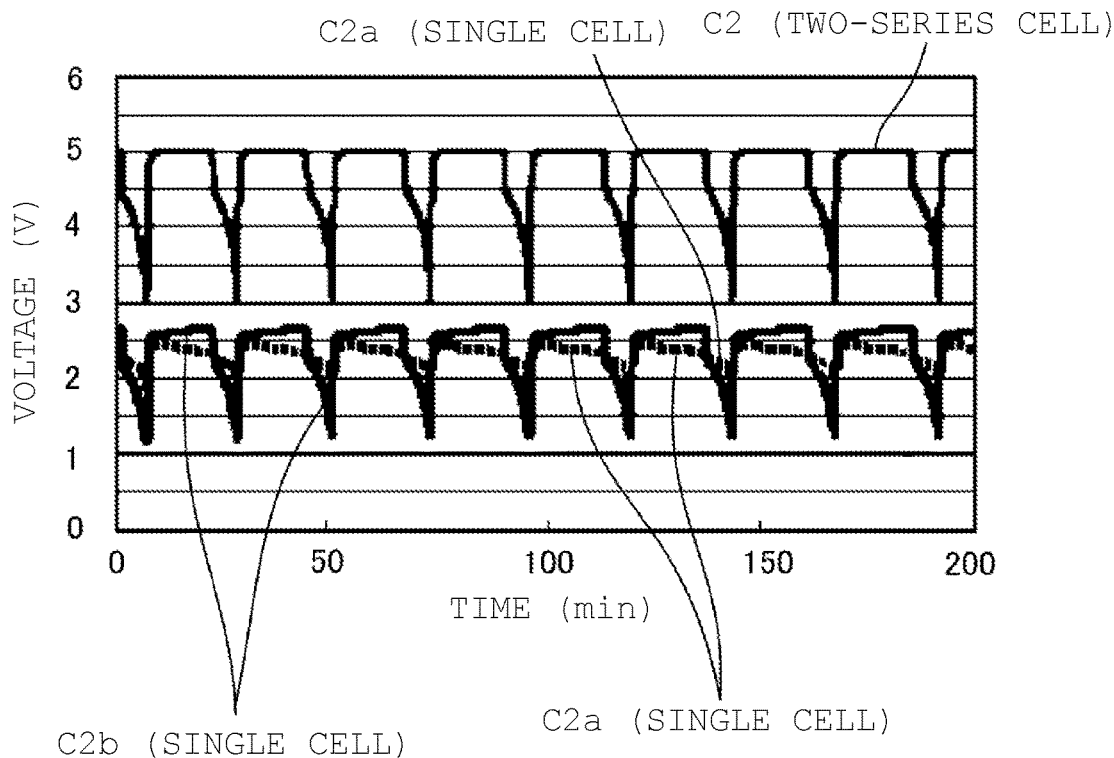
FIG. 10 is a diagram showing the results of checking: (a) the voltage behavior in the case of discharging the whole two-series non-aqueous electrolyte secondary battery C2 (two-series cell); and; and (b) the voltage behaviors (voltage balance) in the case of discharging each of non-aqueous electrolyte secondary batteries C2$a$ and C2$b$ constituting the two-series non-aqueous electrolyte secondary battery C2, for the two-series non-aqueous electrolyte secondary battery C2 after the implementation of 772 cycles, with cycle characteristics significantly degraded, as shown in FIG. 9.

As shown in FIG. 10, the two-series non-aqueous electrolyte secondary battery C2 (two-series cell) underwent a voltage drop to 3 V. In contrast, it has been confirmed that one non-aqueous electrolyte secondary battery C2a (single cell) of the two non-aqueous electrolyte secondary batteries C2a and C2b connected in series underwent a voltage drop to approximately 2 V, whereas the other non-aqueous electrolyte secondary battery C2b (single cell) underwent a voltage drop to around 1 V, thereby resulting in the discharge cut off.

Further, Table 2 shows the discharge capacities (mAh) of the two-series non-aqueous electrolyte secondary battery C2, and of one non-aqueous electrolyte secondary battery C2a (single cell) and the other non-aqueous electrolyte secondary battery C2b (single cell) constituting the two-series non-aqueous electrolyte secondary battery C2.

TABLE 2

|  | One non-aqueous electrolyte secondary battery (single cell) C2a | The other non-aqueous electrolyte secondary battery (single cell) C2b | Two-series non-aqueous electrolyte secondary battery (two-series cell) C2 |
| --- | --- | --- | --- |
| Discharge capacity (mAh) | 10.90 | 6.48 | 6.45 |

As shown in Table 2, it has been confirmed that even when one non-aqueous electrolyte secondary battery C2a has a high discharge capacity, while the other non-aqueous electrolyte secondary battery C2b has a low discharge capacity, the two-series non-aqueous electrolyte secondary battery C2 of the two connected in series has a reduced discharge capacity.

From this result, it has been determined that in the case of the two-series non-aqueous electrolyte secondary battery having the two non-aqueous electrolyte secondary batteries connected in series as described above, the single cells have favorable cycle characteristics to the discharge cutoff voltage in excess of 1.0 V, while there is a tendency to result in significantly degraded cycle characteristics in spite of the cutoff voltage per single cell equivalent to 1.5 V (the discharge cutoff voltage of 3 V in the two-series non-aqueous electrolyte secondary battery) in the case of using the two connected in series.

Therefore, in order to prevent such an event, a model for a discharge behavior at a single cell was considered for a non-aqueous electrolyte secondary battery to which the control method according to the present invention is applied.

It is to be noted that FIG. 11 is a diagram showing a model for a discharge behavior at a single cell for a non-aqueous electrolyte secondary battery to which the control method according to the present invention is applied.

As a result of the consideration, events such as:

[1] as shown in FIG. 11, the fact that there is a plateau region (a region with small changes in potential) around 2.3 V;

[2] in addition, as can be seen from FIG. 11, the fact that there is a sudden drop in voltage even with a "slight difference in capacity" at the end of the discharge; and

[3] furthermore, as can be seen from FIG. 11, the fact that to there is an instant drop in voltage to a voltage around 2.3 V in the case of discharge from a state of full charge have been confirmed.

In addition, Table 3 shows the fluctuation ranges of the discharge voltages for one non-aqueous electrolyte secondary battery C2a and the other non-aqueous electrolyte secondary battery C2b in the case of the discharge cutoff voltage set to be 3.4 V for the two-series non-aqueous electrolyte secondary battery configured according to this embodiment, and Table 4 shows the fluctuation ranges of the discharge ranges for the fluctuation regions of the discharge voltages for one non-aqueous electrolyte secondary battery C2a and the other non-aqueous electrolyte secondary battery C2b in the case of the discharge cutoff voltage set to be 3.0 V therefor.

TABLE 3

Discharge Voltages of Batteries C2a, C2b in the case of Discharge Cutoff Voltage of 3.4 V

| Battery C2a | 2.3 | 2.2 | 2.1 | 2.0 | 1.9 | 1.8 | 1.7 |
| Battery C2b | 1.1 | 1.2 | 1.3 | 1.4 | 1.5 | 1.6 | 1.7 |

TABLE 4

Discharge Voltages of Batteries C2a, C2b in the case of Discharge Cutoff Voltage of 3.0 V

| Battery C2a | 2.3 | 2.2 | 2.1 | 2.0 | 1.9 | 1.8 | 1.7 | 1.6 | 1.5 |
| Battery C2b | 0.7 | 0.8 | 0.9 | 1.0 | 1.1 | 1.2 | 1.3 | 1.4 | 1.5 |

As shown in Table 3, in the case of the two-series non-aqueous electrolyte secondary battery configured according to this embodiment, the discharge potentials for one non-aqueous electrolyte secondary battery and the other non-aqueous electrolyte secondary battery fall within the range of 2.3 V:1.1 V to 1.7 V:1.7 V in the case of the discharge cutoff voltage set to be 3.4 V.

On the other hand, as shown in Table 4, it is determined that even with the two-series non-aqueous electrolyte secondary battery configured according to this embodiment, the discharge potentials for one non-aqueous electrolyte secondary battery and the other non-aqueous electrolyte secondary battery unfavorably vary from 2.3 V:0.7 V even to 1.5 V:1.5 V, and may be lower than 1.0 V in the case of the discharge cutoff voltage set to be 3.0 V.

As a result of the foregoing consideration, the conclusion is drawn as described below.

In the two-series non-aqueous electrolyte secondary battery having the two non-aqueous electrolyte secondary batteries (non-aqueous electrolyte secondary batteries to which the control method according to the present invention is applied) connected in series, the discharge voltages vary differently with a "slight difference in capacity" at the end of the discharge, even when one non-aqueous electrolyte secondary battery and the other of the two non-aqueous electrolyte secondary batteries are almost equal in discharge voltage (for example, 1.8 V) (see the description in the foregoing section [2]).

However, as in the present invention, cycles with a lower limit voltage of 3.4 V cause the relation between the discharge potentials of the two non-aqueous electrolyte secondary batteries to fall within the range of 2.3 V:1.1 V to 1.7 V:1.7 V as shown in Table 3, because of an instant drop in voltage in the case of discharge from a state of full charge, for example, even when the discharge cutoff voltage is decreased for either one of the two non-aqueous electrolyte secondary batteries, and never cause the potentials to be 1.0 V or lower for either of the non-aqueous electrolyte secondary batteries (the voltage per single cell is never 1.0 V or lower) (see the description in the foregoing section [3]).

Further, it is also clear that the single cells have favorable cycle characteristics to the discharge cutoff voltage in excess of 1.0 V, from the foregoing results of the cycle tests for the single cell as shown in FIGS. 3 to 8.

Accordingly, in the two-series non-aqueous electrolyte secondary battery having the two non-aqueous electrolyte secondary batteries connected in series to which the control method according to the present invention is applied, the discharge cutoff voltage is set to fall within the range of 3.4 V to 4.6 V, thereby making it possible to prevent, even when one non-aqueous electrolyte secondary battery and the other lose the capacity balance therebetween, the phenomenon of causing overdischarge degradation and causing the overdischarge degradation to cause further overdischarge degradation, and thus improve cycle characteristics of the two-series non-aqueous electrolyte secondary battery dramatically.

More specifically, in the case of using the two-series non-aqueous electrolyte secondary battery having the two non-aqueous electrolyte secondary batteries connected in series, each basically composed of: a negative electrode containing, as its main constituent, a spinel-type lithium-titanium composite oxide; a positive electrode that has a higher potential than the spinel-type lithium-titanium composite oxide; and an organic electrolytic solution, where the electric capacity of the negative electrode is made lower than the electric capacity of a rechargeable region of the positive electrode, the discharge cutoff voltage is set to fall within the range of 3.4 V or more and 4.6 V or less, thereby making it possible to prevent, even when one non-aqueous electrolyte secondary battery and the other, the two lose the capacity balance therebetween, the phenomenon of causing overdischarge degradation and causing the overdischarge degradation to cause further overdischarge degradation, and thus improve cycle characteristics of the two-series non-aqueous electrolyte secondary battery substantially.

In addition, the need of balance circuits which have been required conventionally is eliminated, thereby making it possible to reduce the number of components significantly, and thus make a reduction in cost.

The present invention is not to be considered limited to the embodiment described above, but various applications and modifications can be made within the scope of the invention.

DESCRIPTION OF REFERENCE SYMBOLS

10: battery element
11: positive electrode
12: negative electrode
13: separator
14, 15: lead tab
16, 17: sealant
18: outer package material
20: non-aqueous electrolyte secondary battery

The invention claimed is:

1. A method for controlling a non-aqueous electrolyte secondary battery, the method comprising:
   connecting two non-aqueous electrolyte secondary batteries in series; and
   setting a discharge cutoff voltage to 3.4 V to 4.6 V,
   wherein each of the two non-aqueous electrolyte secondary batteries connected in series comprises:
   an exterior material;
   a positive electrode housed in the exterior material, the positive electrode including $LiCO_2$;
   a negative electrode housed in the exterior material, the negative electrode including $Li_4Ti_5O_{12}$; and
   a non-aqueous electrolyte in the exterior material,
   the positive electrode and the negative electrode meeting 1.0>X, wherein
   X is an actual electric capacity ratio denoted by (B/A),
   A is an actual electric capacity (mAh) at 25° C. per 1 $cm^2$ area of the positive electrode, and
   B is an actual electric capacity (mAh) at 25° C. per 1 $cm^2$ area of the negative electrode.

2. The method according to claim 1, further comprising setting a charge cutoff voltage to 5.50 V.

3. The method according to claim 1, further comprising setting a charge cutoff voltage to 5.20 V.

4. The method according to claim 1, further comprising setting a charge cutoff voltage to 5.00 V.

* * * * *